Dec. 13, 1932.    S. Z. DE FERRANTI    1,891,143
INDUCTION ELECTRICITY METER
Filed Oct. 28, 1929    3 Sheets-Sheet 2

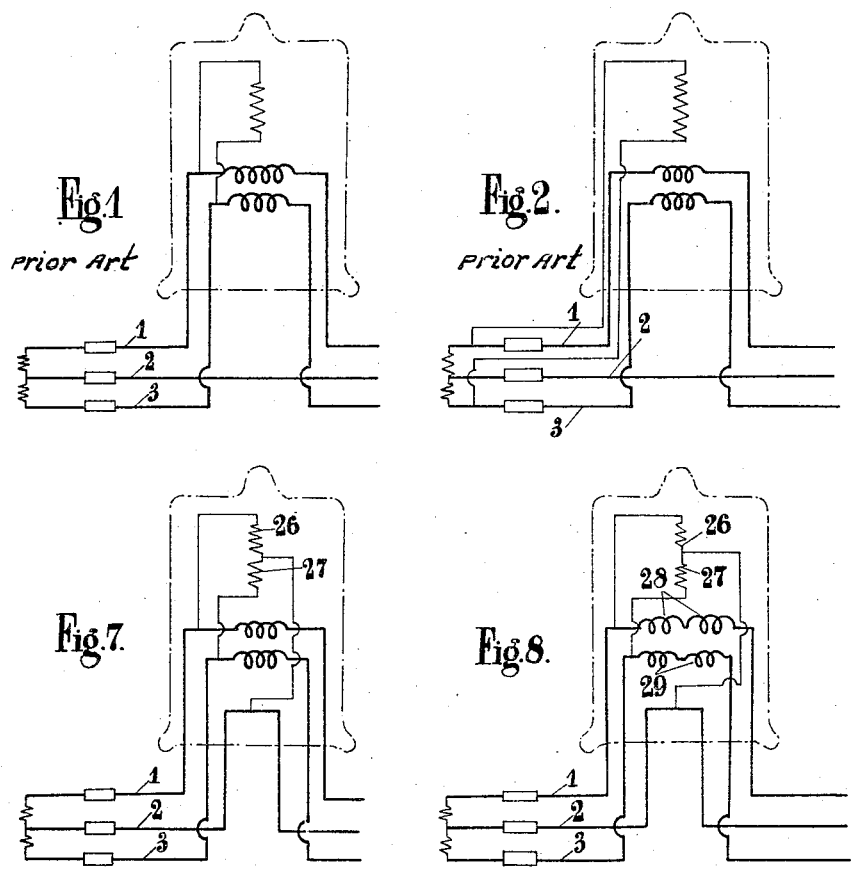

S. Z. de Ferranti
INVENTOR

By: Marks & Clerk
ATYS.

Dec. 13, 1932.  S. Z. DE FERRANTI  1,891,143
INDUCTION ELECTRICITY METER
Filed Oct. 28, 1929   3 Sheets-Sheet 3
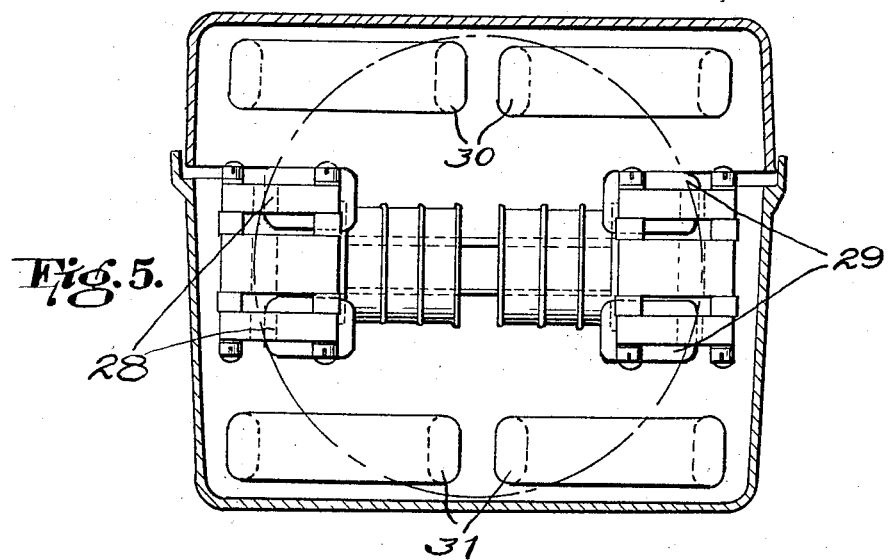
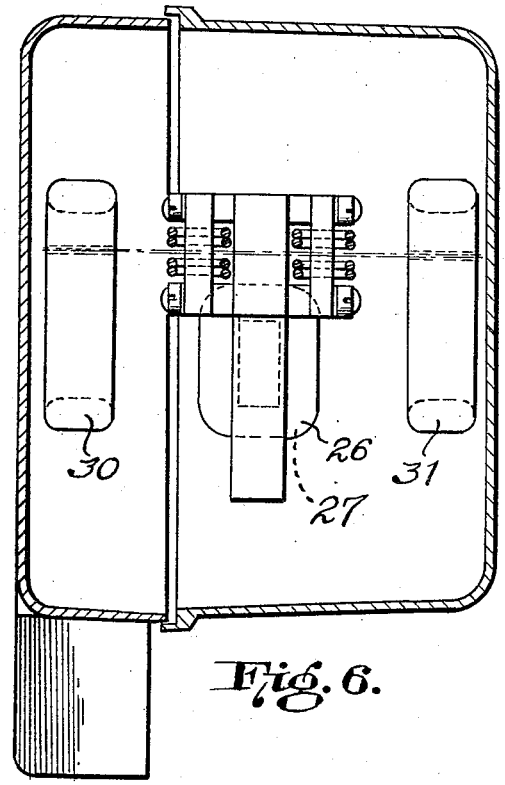
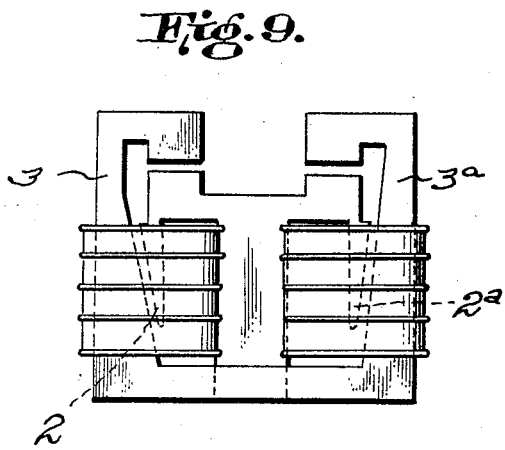
INVENTOR.
S. Z. de Ferranti
BY: Marks & Clerk
ATTORNEYS.

Patented Dec. 13, 1932

1,891,143

UNITED STATES PATENT OFFICE

SEBASTIAN ZIANI DE FERRANTI, OF HOLLINWOOD, ENGLAND, ASSIGNOR TO FERRANTI INC., OF NEW YORK, N. Y.

INDUCTION ELECTRICITY METER

Application filed October 28, 1929, Serial No. 403,030, and in Great Britain November 5, 1928.

This invention relates to alternating current induction electricity meters for use on three-wire systems and has for its object to provide improved constructions thereof.

Heretofore with such systems it has been customary to employ a single magnetic system with separate windings energized by current in the outer wires respectively and with a single shunt coil connected across the outer wires as illustrated in Figure 1. With such arrangement, however, should the fuse blow in one of outer wires then not only will the movement of that part of the circuit cease functioning but the movement of the unaffected part also will cease functioning owing to the shunt coil circuit being opened. Thus the meter will cease registering altogether although current may still be obtained from the unaffected part of the system.
In order to avoid this difficulty it is usual to take the shunt coil connections to the live side of the fuses as shown in Figure 2 so that the shunt coil may remain energized irrespectively of the condition of the fuses but this measure introduces drawbacks owing to the need for special wiring and owing to the danger resulting from the shunt coil circuit not being protected by fuses.

The present invention removes all the above drawbacks.

Referring to the accompanying diagrammatic drawings:—

Figures 1 and 2 are diagrams illustrating known systems of connection for A. C. induction electricity meters.

Figures 3, 4, 5 and 6 illustrate one convenient construction of meter in accordance with the present invention.

Figures 7 and 8 are explanatory diagrams.
Figure 9 illustrates a modified construction of meter in accordance with the present invention.

The invention consists in an alternating current single-phase three-wire induction electricity meter including two voltage coils mounted upon a common magnetic core having a leakage field path of low reluctance and two air gaps occupied by a common rotor, said coils being adapted to be connected respectively between an outer wire and the neutral wire of a three-wire system, a pair of further magnetic cores each carrying a current coil mounted adjacent to each air gap, said current coils being adapted to be connected in series in the respective outer wires.

The invention also consists in an alternating current single-phase three-wire induction electricity meter as set forth above, wherein said further magnetic cores serve to maintain the common magnetic core elements in fixed relative positions.

The invention also consists in A. C. induction electricity meters substantially as hereinafter described.

Figure 3:
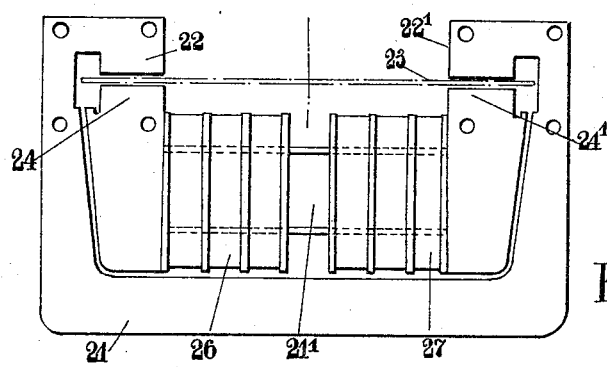
Figure 4:
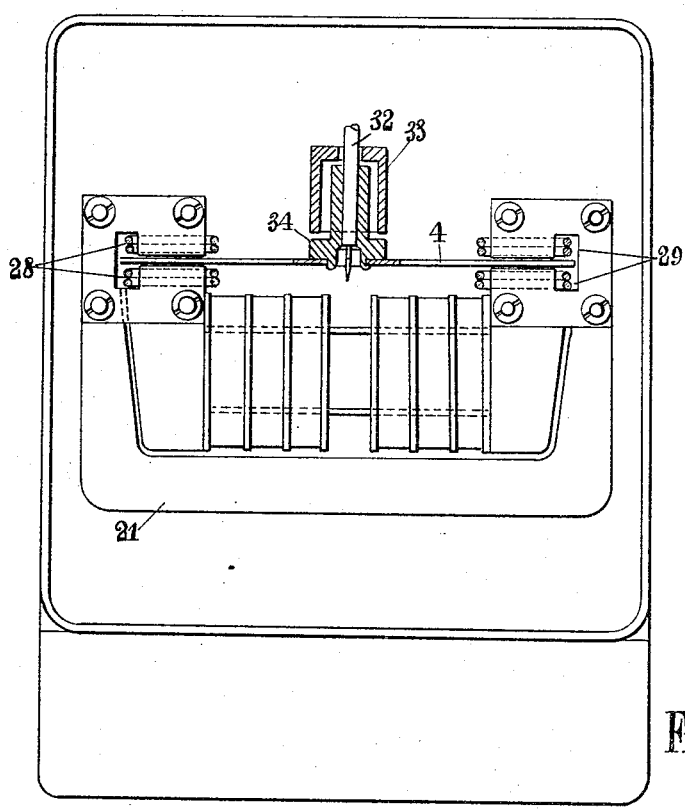

In carrying the invention into effect in one convenient form by way of example, as illustrated in Figures 3–6, I provide a shunt magnetic core 21 formed somewhat of C shape, the two extremities 22, 22' of the core being in proximity to a rotor disc at points at the opposite ends of the diameter thereof. At the other side of the rotor disc a further limb 21' of the core terminates in pole pieces 24, 24' adjacent the pole pieces in the main core limbs mentioned above.

This additional core limb 21' is provided with two shunt coils 26, 27, a pair of separate series magnet cores carrying windings 28 is provided one at each side of the core extremities 22, 24 and a further pair of separate series magnet cores carrying windings 29 adjacent the core extremity 22', 24'. Each winding 28, 29 is in two parts one above and one below the disc 4. The series magnet cores are clamped to the sides of the shunt core pole pieces thus serving incidentally to maintain the two limbs 21, 21' of the latter in fixed relative position.

Two separate pairs of braking magnets 30, 31 are provided on a diameter which is preferably at right angles to the diameter containing the pole pieces mentioned above.

The shunt coils 26, 27 are connected in series and the two extreme ends are connected to the two outer wires 1, 3 of an A. C. single phase three-wire system, the junction point between the two shunt coils being connected to the central or neutral wire 2 as shown in Figure 8. The two pairs of series coils 28, 29 are connected respectively in series with the outer wires 1 and 3 so as to be traversed by the respective load currents. The rotor 4 is mounted upon a spindle 32 which is preferably supported by a magnetic suspension device 33, 34.

The construction and arrangement of the shunt magnet core 21, 21' is such as to serve for the shunt windings of both driving elements although each is complete in itself electrically. It will be appreciated that under conditions of equal loading on the two portions of the system a substantially balanced net driving torque is applied to the rotor disc and when a magnetic suspension such as referred to above is employed the net lateral thrust and axial thrust applied to the supporting bearings for the rotor are reduced to an extremely low magnitude.

According to a modification illustrated in Figure 9 we provide a construction of shunt magnet core wherein the centre limb is unwound and two separate shunt coils are provided round the portions 2, 3 and $2^a$, $3^a$ respectively, the series coils (not shown) being associated with the respective outer conductors as in the above example.

I claim:

1. An alternating current single-phase three-wire induction electricity meter including two voltage coils mounted upon a common magnetic core having a leakage field path of low reluctance and two air gaps occupied by a common rotor, said coils being adapted to be connected respectively between an outer wire and the neutral wire of a three-wire system, a pair of further magnetic cores each carrying a current coil mounted adjacent to each air gap, said current coils being adapted to be connected in series in the respective outer wires.

2. An alternating current single-phase three-wire induction electricity meter as claimed in claim 1, wherein said further magnetic cores serve to maintain the common magnetic core elements in fixed relative positions.

In testimony whereof I have signed my name to this specification.

SEBASTIAN ZIANI DE FERRANTI.